US012680466B2

(12) United States Patent
Ried et al.

(10) Patent No.: US 12,680,466 B2
(45) Date of Patent: Jul. 14, 2026

(54) INTEGRATED MACHINE SPEED SIGNAL WAVEFORM CAPTURE

(71) Applicant: Woodward, Inc., Fort Collins, CO (US)

(72) Inventors: David L. Ried, Severance, CO (US);
Steve Pacheco, Fort Collins, CO (US);
Bryan W. Guild, Fort Collins, CO
(US); Dave Rubenthaler, Fort Collins,
CO (US)

(73) Assignee: Woodward, Inc., Fort Collins, CO (US)

( * ) Notice: Subject to any disclaimer, the term of this
patent is extended or adjusted under 35
U.S.C. 154(b) by 490 days.

(21) Appl. No.: 18/336,717

(22) Filed: Jun. 16, 2023

(65) Prior Publication Data

US 2024/0418099 A1    Dec. 19, 2024

(51) Int. Cl.
*F01D 17/06* (2006.01)
*F02C 9/00* (2006.01)
*G01P 3/489* (2006.01)

(52) U.S. Cl.
CPC ................ *F01D 17/06* (2013.01); *F02C 9/00*
(2013.01); *G01P 3/489* (2013.01)

(58) Field of Classification Search
CPC .... F01D 17/06; F02C 9/00; F02C 9/28; G01P
3/489; G01P 3/481; G01P 3/487; G01P
3/49; G01P 3/488; G05B 19/042
See application file for complete search history.

(56) References Cited

U.S. PATENT DOCUMENTS 7,640,802 B2    1/2010  King et al.
7,692,324 B2    4/2010  Malakhova et al.

9,840,935 B2    12/2017  Khibnik
10,392,962 B2    8/2019  Rowe et al.
11,592,455 B2    2/2023  Vaske et al.
2007/0000230 A1*  1/2007  Jones ................. G05B 23/0291
60/39.281

(Continued)

FOREIGN PATENT DOCUMENTS

DE        102017205712        10/2017

OTHER PUBLICATIONS

International Search Report and Written Opinion in International
Appln. No. PCT/US2024/033608, mailed on Sep. 17, 2024, 15
pages.

(Continued)

*Primary Examiner* — Alexander Satanovsky
(74) *Attorney, Agent, or Firm* — Fish & Richardson P.C.

(57) ABSTRACT

The subject matter of this specification can be embodied in,
among other things, a method for controlling a turbine
engine that includes measuring, by a speed sensor, wave-
forms indicative of a speed of a rotating machine. Receiving
the waveforms from the speed sensor and providing data
representing the waveforms to a first signal path and to a
second signal path, wherein the second signal path is iso-
lated from the first signal path such that data communica-
tions at the second signal path do not interfere with com-
munications on the first signal path. Controlling, responsive
to the data received along the first signal path, one or more
operations of the rotating machine. Storing, the data
received along the second signal path, individual samples of
the data in association with a respective timestamp indicat-
ing a time that the data was received.

20 Claims, 8 Drawing Sheets

(56)                    References Cited

U.S. PATENT DOCUMENTS

| | | | |
|---|---|---|---|
| 2013/0320970 A1 * | 12/2013 | Foletto ................. | G01D 5/2448 |
| | | | 324/251 |
| 2015/0007636 A1 * | 1/2015 | Benkert ............. | G01N 33/0073 |
| | | | 73/53.01 |
| 2015/0345325 A1 * | 12/2015 | Khibnik ................ | G01M 15/14 |
| | | | 702/185 |
| 2020/0211754 A1 | 7/2020 | Zhang et al. | |
| 2021/0215061 A1 * | 7/2021 | Vaske .................. | G05B 13/024 |
| 2022/0099463 A1 | 3/2022 | Schmidt et al. | |
| 2022/0284330 A1 * | 9/2022 | Ambrus ................... | G06N 7/01 |

OTHER PUBLICATIONS

International Preliminary Report on Patentability in International
Appln. No. PCT/US2024/033608, mailed on Dec. 26, 2025, 9
pages.

* cited by examiner

INTEGRATED MACHINE SPEED SIGNAL WAVEFORM CAPTURE

This specification relates to monitoring and controlling turbines.

BACKGROUND

A turbine is a rotary mechanical device that converts energy from a fluid flow input to work output, such as by providing thrust or rotary mechanical power. A turbine is a turbomachine with at least one moving part called a rotor assembly, which is a shaft or drum onto which blades attached. Moving fluid acts on the blades so that they move and impart rotational energy to the rotor.

Industrial turbine and aircraft turbine engine control requires feedback, which can be done by sensing the rotational speed of the turbine/engine. The speed is typically sensed using a variable reluctance sensor and a gear, with the gear rotating at a speed proportional to the speed of the shaft(s) of the turbine. The resultant signal is similar to a sine wave.

SUMMARY

In general, this document describes systems and techniques for monitoring and controlling speed sensing systems for rotational machinery e.g., turbines. More specifically, techniques for monitoring and controlling machinery speed sensing, e.g., machinery speed sensor waveform analysis, diagnostics, troubleshooting, and control.

In general, innovative aspects of the subject matter described in this specification can be embodied in a machinery speed control system that includes a speed sensor, detection circuitry, control circuitry, and measurement circuitry. The speed sensor is configured to measure a speed of a rotating machine. The detection circuitry is in communication with and isolated from the speed sensor. The detection circuitry is configured to receive waveforms measured by the speed sensor and provide data representing the waveforms to both a first output and a second output, the second output being isolated from the first output such that data communications at the second output do not interfere with communications on the first output. The control circuitry is coupled to the first output of the detection circuitry and is configured to control one or more operations of the rotating machine responsive to the data from the detection circuitry. The measurement circuitry is coupled to the second output of the detection circuitry, and the measurement circuitry is configured to sample the data from the detection circuitry and store individual samples in association with a respective timestamp indicating a time that the data was received. This and other implementations can each optionally include one or more of the following features.

In some implementations, each sample of the data includes a plurality of waveforms representing at least one full rotation of the rotating machine.

In some implementations, each sample of the data includes first data representing waveforms measured by the speed sensor and second data representing a gear tooth detection signal based on waveforms.

In some implementations, the measurement circuitry includes a user interface configured to permit a user to access and view the individual samples.

In some implementations, the measurement circuitry is configured to determine, for at least one sample, a margin between a peak of the waveform and a gear tooth detection threshold value, and to store the margin in associate with the sample.

In some implementations, the rotating machine is a gas turbine. In some implementations, the rotating machine is a steam turbine.

Some implementations include a machine learning model configured to receive as input a plurality of individual samples and, based on comparing the individual samples, identify a sensor fault.

In some implementations, the measurement circuitry is configured to store, with each individual sample, a tooth detection threshold used by the control circuitry at the time of the individual sample.

In some implementations, the speed sensor is a magnetic pickup unit, a proximity probe, an eddy-current probe, or a variable reluctance type sensor.

A second general aspect can be embodied in a system that includes a rotating machine having a speed control system. The speed control system includes a speed sensor coupled to the rotating machine and configured to measure a speed of the rotating machine, a detection circuitry in communication with and magnetically isolated from the speed sensor. The detection circuitry is configured to receive waveforms measured by the speed sensor and provide data representing the waveforms to both a first output and a second output, the second output being isolated from the first output such that data communications at the second output do not interfere with communications on the first output. The speed control system also includes control circuitry coupled to the first output of the detection circuitry and measurement circuitry coupled to the second output of the detection circuitry. The control circuitry is configured to control one or more operations of the rotating machine responsive to the data from the detection circuitry. The measurement circuitry is configured to sample the data from the detection circuitry and store individual samples in association with a respective timestamp indicating a time that the data was received. This and other implementations can each optionally include one or more of the following features.

In some implementations, each sample of the data includes a plurality of waveforms representing at least one full rotation of the rotating machine.

In some implementations, each sample of the data includes first data representing waveforms measured by the speed sensor and second data representing a gear tooth detection signal based on waveforms.

In some implementations, the measurement circuitry includes a user interface configured to permit a user to access and view the individual samples.

In some implementations, the measurement circuitry is configured to determine for at least one sample a margin between a peak of the waveform and a gear tooth detection threshold value, and store the margin in associate with the sample.

In some implementations, the rotating machine is a gas turbine. In some implementations, the rotating machine is a steam turbine.

In some implementations, the speed control system includes a machine learning model configured to receive as input a plurality of individual samples and, based on comparing the individual samples, identify a sensor fault.

In some implementations, measurement circuitry is configured to store, with each individual sample, a tooth detection threshold used by the control circuitry at the time of the individual sample.

In a second general aspect, innovative aspects of the subject matter described in this specification can be embodied in machine control methods that include actions of measuring, by a speed sensor, waveforms indicative of a speed of a rotating machine. Receiving the waveforms from the speed sensor and providing data representing the waveforms to a first signal path and to a second signal path, wherein the second signal path is isolated from the first signal path such that data communications at the second signal path do not interfere with communications on the first signal path. Controlling, responsive to the data received along the first signal path, one or more operations of the rotating machine. Storing, the data received along the second signal path, individual samples of the data in association with a respective timestamp indicating a time that the data was received. Other implementations of this aspect include corresponding systems, apparatus, and computer programs, configured to perform the actions of the methods, encoded on computer storage devices.

The systems and techniques described here may provide one or more of the following advantages. For example, a system can provide accurate rotational speed measurement and recording over various stages in the lifetime of a particular machine. Some implementations enable advanced detection of speed sensing faults, deterioration of speed sensor measurements, and/or advanced correction of speed sensing errors before mechanical damage results.

The details of one or more implementations are set forth in the accompanying drawings and the description below. Other features and advantages will be apparent from the description and drawings, and from the claims.

DESCRIPTION OF DRAWINGS

Like reference numbers and designations in the various drawings indicate like elements.

DETAILED DESCRIPTION

This document describes systems and techniques for monitoring and controlling speed sensing systems for rotational machinery, such as industrial turbines or aircraft engines. Industrial turbine and aircraft engine controllers generally use sensed rotational speeds of the turbine/engine as control feedback. In general, a frequency/speed sensing system of an engine control system determines a controlled arming voltage and/or triggering threshold voltage that is fixed or adaptive as engine control conditions change.

Moreover, turbine control systems use speed input as a critical control parameter. However, robust operation with some speed sensing probes can be difficult because of a wide range of variables that affect the accuracy of the speed measurements made from sensor output waveforms. Such variables can include speed wheel and gear dimensions, cable parameters, impedance matching, and detection circuitry sensitivities. That said, visibility in into the waveform signal quality of the speed sensor during turbine operation can improve system operation. Further, recordation of sensor output over time can provide for advance detection of speed sensor signal degradation in advance of mechanical problems.

Systems and processes described below provide turbine operators with data to enable diagnostic/prognostic strategies to identify and correct problems with turbine speed sensing systems. Moreover, the waveform capture system permits real-time capture and analysis of speed sensor data during the operation of a turbine. In some implementations, the waveform capture is independent of turbine speed control and safety functions so as not to interfere with the run-time deterministic control of the turbine. The waveform capture system can yet be integrated into the turbine control system (without interfering with run-time control and safety), and made available to the user regardless of the turbine operating state.

Figure 1:
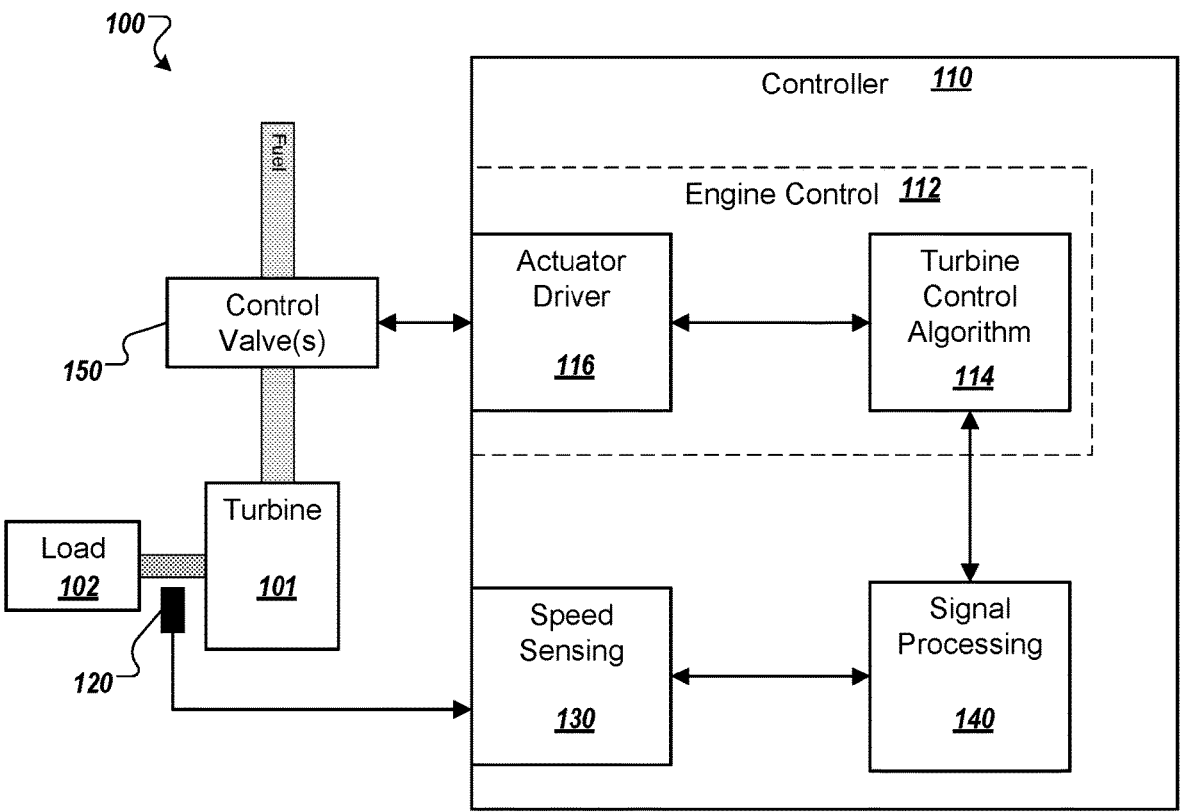
FIG. 1 is a schematic diagram that shows an example of a system for controlling a turbine engine.

FIG. 1 is a schematic diagram that shows an example of a system 100 for controlling a rotational machine such as a turbine 101 that drives a load 102 (e.g., working output). The turbine 101 can be, e.g., a gas turbine or a steam turbine. The speed of the turbine 101 is controlled by a speed control signal provided by an engine controller 112 of a turbine system controller 110. The rotation or rotational speed of the turbine 101 or the load 102 drives a speed sensing system 130, which will be described in more detail in the description of FIG. 2. The engine controller 112 (e.g., a turbine engine controller) is also configured to receive feedback about the operational conditions of the load 102 and/or the turbine 101 (e.g., temperature, vibration levels, intake temperature, exhaust temperature). The engine controller 112 can include a turbine control algorithm 114 and an actuator driver 116. The turbine control algorithm 114 is configured to receive the feedback about the operations conditions of the load 102 and/or turbine 101 and regulate operation of the turbine 101 in response to such feedback. The turbine control algorithm 114 provides control signals to actuator driver(s) 116. Actuator drivers process control signals form the turbine control algorithm 114 and control the operation of the turbine 101 by adjusting appropriate control valves 150 (e.g., fuel throttles, air intake valves, cooling system valves, etc.). A speed sensor 120 is installed within the turbine 101 and arranged to detect the rotational speed of the turbine 101 or the rotational speed of the turbine's shaft. Details of the speed sensor 120 operation are described below in reference to FIG. 2. In general, the speed sensor 120 can be a magnetic pickup unit (MPU), a proximity probe, an eddy-current probe, or a variable reluctance type sensor.

In the example of the system 100, the speed sensing system 130 receives an analog sensor input signal waveform from a speed sensor 120 in response to rotation of an output of the load 102 or the turbine 101. The speed sensing system 130 converts this analog sensor waveform into a frequency signal. The frequency signal is an analog or digital pulse train that resembles a digital or rectangular waveform that is provided to the turbine system controller 110 as a feedback signal (e.g., for use by the engine controller 112 to determine the speed control signal). In some implementations, the frequency signal can be provided directly to the turbine system controller 110 as a feedback signal. In some implementations, the frequency signal can be provided to the turbine system controller 110 in another form, such as a digital signal that represents the frequency value or as a digitized data stream that represents the frequency signal.

The speed sensing system 130 is configured to receive configuration settings from an adaptive speed sensing signal processing module 140. As will be discussed in more detail below, the amplitude and shape of the analog sensor waveform can change as the operational conditions of the load 102 and/or the turbine 101 changes, and over the lifetime of the turbine 101. The configuration settings define how the speed sensing system 130 is to determine the occurrences of cycles in the analog sensor waveform and produce the pulses of the frequency signal (e.g., how to provide one frequency pulse per analog sensor waveform cycle) at various speeds of the load 102 and/or the turbine 101.

In various implementations, individual or combinations of various operational conditions of the system 100 can affect the analog sensor waveform. For example, the temperature of the internal components of the sensor, and/or the speed at which the internal mechanical components of the speed sensing system 130 are rotated can change the amplitude and/or shape of the waveform. Vibrations and ambient electromagnetic emissions can introduce electrical noise in the analog sensor waveform. The mechanical loading and/or acceleration of the engine can affect the analog sensor waveform shape. Cable degradation, probe alignment variation, and damage or wear of gear teeth can result in degradation of analog sensor waveform shape over time and may result in difficult to diagnose warnings and operational control errors. The signal processing module 140 is configured to receive information about operations conditions of the system 100, such as these and/or others, from the turbine system controller 110 and the speed sensing system 130 to adaptively and dynamically reconfigure the configuration settings provided to speed sensing system 130 as the operational conditions change.

The operation modules of controller 110 can be provided as one or more computer executable software modules, hardware modules, or a combination thereof. For example, one or more of the turbine control algorithm 114, actuator driver 116, speed sensing system 130, and speed sensing system 130 can be implemented as blocks of software code with instructions that cause one or more processors of the control system 100 to execute operations described herein. In addition or alternatively, one or more of the operations modules can be implemented in electronic circuitry such as, e.g., programmable logic circuits, field programmable logic arrays (FPGA), or application specific integrated circuits (ASIC).

Figure 2:
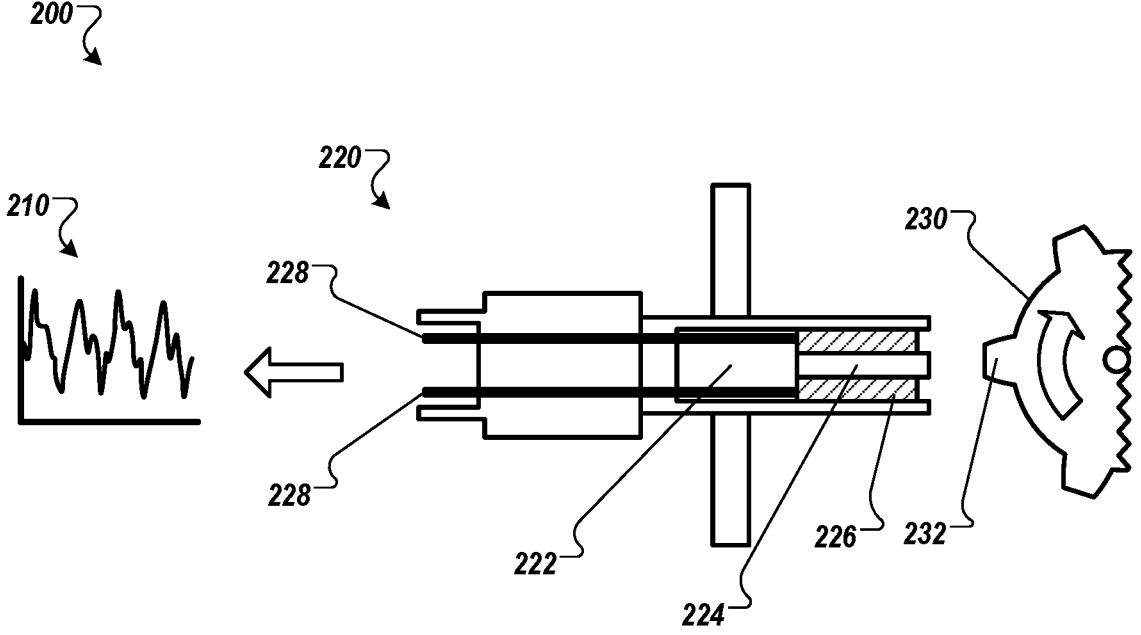
FIG. 2 is a cross-sectional view of an example speed sensor.

FIG. 2 is a cross-sectional view of an example speed sensor 200. In some implementations, the speed sensor 200 can be the speed sensing system 130 of the example system 100 of FIG. 1. The speed sensor 200 can be a variable reluctance type sensor or a magnetic pick-up unit (MPU), in which movement (e.g., rotation of the turbine 101) causes fluctuations in a magnetic field which, in turn, create a periodic analog electrical signal 210 (e.g., an analog sensor waveform) that can be processed (e.g., to determine a frequency pulse train).

Industrial turbine and aircraft engine control generally uses a sensed rotational speed of the turbine/engine as control feedback. The speed can be sensed using a variable reluctance sensor 220 and a gear 230, with the gear 230 configured to rotate at a speed that is proportional to the rotational speed of the engine or turbine.

The variable reluctance sensor 220 includes a magnet 222 and a pole piece 224. The magnet 222 produces a magnetic field around the pole piece 224. A coil 226 of wire is wrapped about the pole piece to form an electromagnetic pickup. The pole piece 224 extends toward the gear 230, which includes a collection of gear teeth 232. The gear 230 is made of a ferrous or otherwise magnetic material, and as the gear 230 rotates, the gear teeth 232 come in and out of proximity of the pole piece 224. This changing proximity causes fluctuations in the magnetic field surrounding the pole piece 224 and the coil 226. The fluctuations in the magnetic field induce electrical current flows in the coil 226 that flow through a pair of connector pins 228 to the input of the speed sensing circuit 130. The fluctuating electrical current flow can be measured at the connector pins 228 as the periodic analog electrical signal 210.

Determination of speed from reluctance sensor signals generally involves a determination of the signal frequency, which is generally proportional to turbine speed. The fundamental frequency of the periodic analog electrical signal 210 is equal to the number of gear teeth 232 multiplied by the number of revolutions per minute of the gear 230 and divided by sixty. The periodic analog electrical signal 210 is similar to a sine wave, but the peaks can be sharper, the zero crossings can be almost flat, and in extreme cases there can be multiple peaks. The periodic analog electrical signal 210 typically changes with engine speed, and the amplitude of the signal typically increases with increasing engine speed. Electrical noise and other operational conditions can further contribute to the complexity of the periodic analog electrical signal 210. By implementing arming and triggering setpoints that can be dynamically adjusted as operating conditions and operational values change, for example as the signal processing module 140 of FIG. 1 can, the actual fundamental frequency of the periodic analog electrical signal 210 can still be obtained despite other complexities of the signal.

Figure 3:
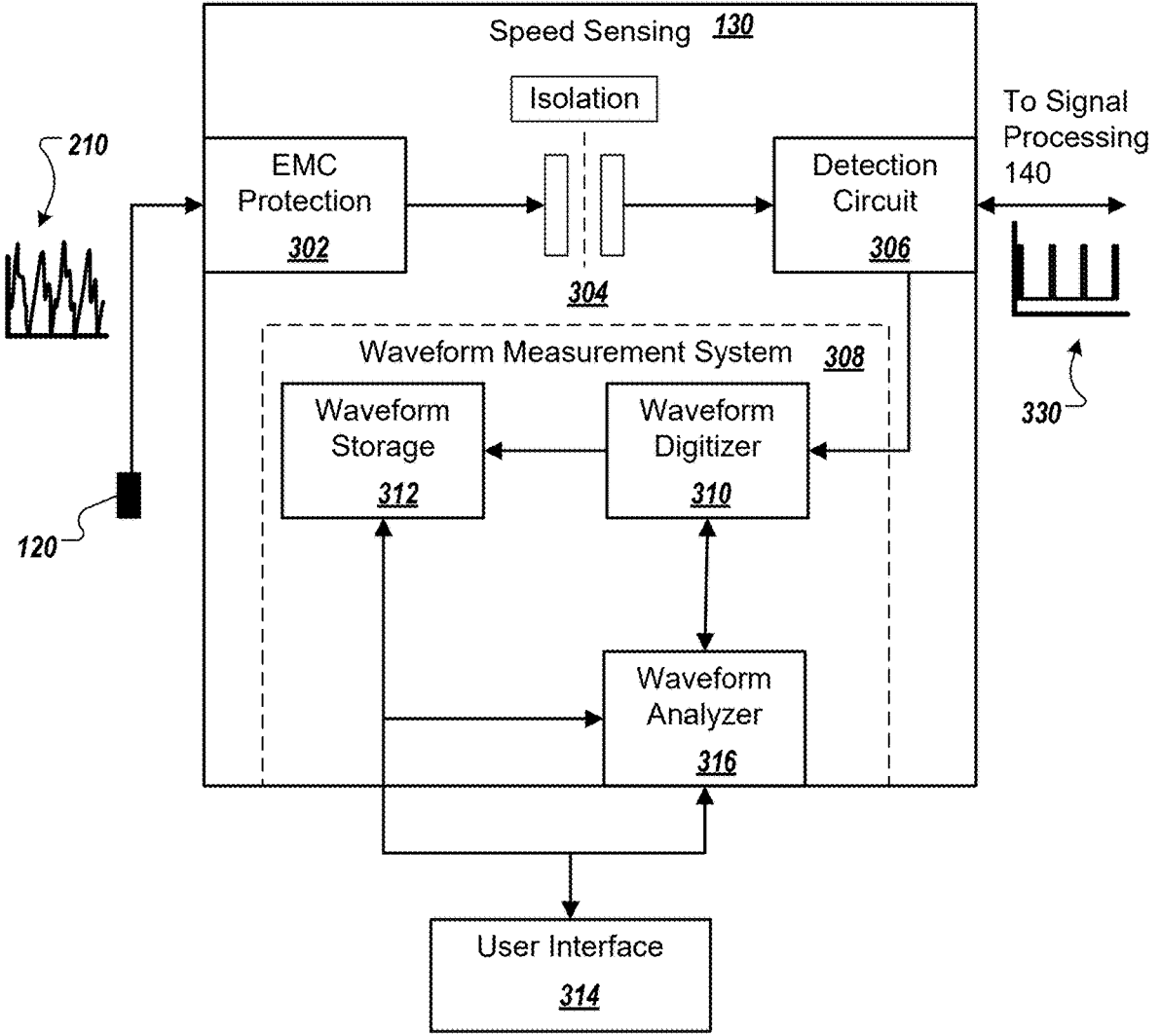
FIG. 3 is a block diagram of the example speed sensing system of FIG. 1.

FIG. 3 is a block diagram of the example speed sensing system 130 of FIG. 1. The speed sensing system 130 receives analog sensor waveforms 210 from the speed sensor 120 through electromagnetic compatibility (EMC) protection 302 hardware/circuitry 302. The EMC protection 302 can include cable shielding, appropriate ground connections, and/or electromagnetic interference (EMI) filters. EMC protection 302 improves the quality of the waveform 210 signals from the speed sensor 120 and minimized the signal noise due to EMI.

Signal isolation 304 isolates the speed sensing system circuitry (and the rest of the turbine controller 110 circuitry) from the turbine field and other high current/high voltage circuitry of the turbine 101. Generally, the speed sensor 120 is grounded to an earth ground or the turbine field ground, while the controller 110 and speed sensing system 130 circuitry is grounded to a processor ground. In some cases, the speed sensor 120 can be ungrounded, while the controller 110 and speed sensing system 130 circuitry are grounded to a processor ground. The signal isolation 304 can be magnetic signal isolation (e.g., isolation transformer(s) and or optical signal isolation.

The detection circuitry 306 is configured to receive configuration settings from the signal processing module 140 and detect pulses in the analog waveform signal 210 to output pulses for a speed pulse waveform 330 that is representative of the turbine's speed. Each pulse of the speed pulse waveform 330 represents the detection of a gear tooth passing by the speed sensor 120, as discussed above in reference to FIG. 2. In the illustrated example, the configuration settings include an arming threshold and a trigger level setting, discussed in more detail below. The detection circuitry 306 is also configured to provide a speed pulse waveform 330 in response to a sensed input signal (e.g., the example periodic analog electrical signal 210) based on the arming threshold setting and the trigger level setting.

The speed sensing system 130 is configured to produce or receive the analog waveform signal 210 as a cyclical, analog waveform having a fundamental frequency that is proportional to the rotational speed of a physical object (e.g., the example turbine 101 or the example load 102 of FIG. 1), and produce the speed pulse waveform 330 to represent the frequency or periodicity of the analog waveform of the analog waveform signal 210. For example, the analog waveform signal 210 can be the example periodic analog electrical signal 210 of FIG. 2, generated in response to rotation of the gear 230. The trigger level setting represents a voltage (or current) level of the analog waveform signal 210 at which the speed sensing system 130 will generate a corresponding frequency edge signal (e.g., the pulses 410). The arming threshold setting represents a voltage (or current) level that must be satisfied before a pulse of the speed pulse waveform 330 can be triggered.

Figure 4:
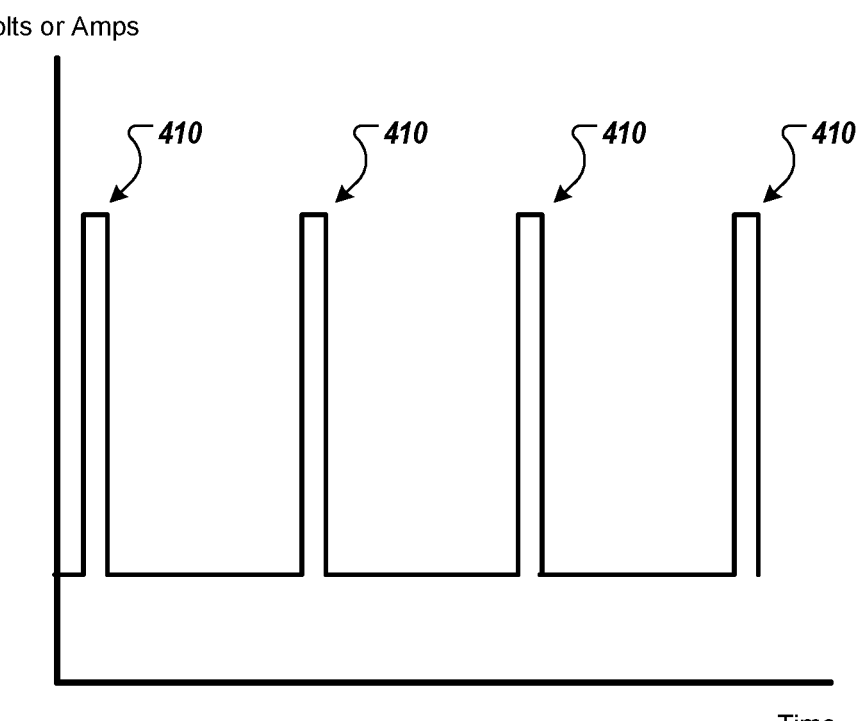
FIG. 4 is a graph of an example speed pulse waveform.

For example, FIG. 4 shows a graph of an example of a speed pulse waveform 330 is shown. The frequency edge signal represents the determined frequency of the analog waveform signal 210. In the illustrated example, the speed pulse waveform 330 is a stream of digital or quasi-digital electrical pulses 410 that are triggered at a rate that matches or is proportional to the occurrence of analog cycles within the analog waveform signal 210. For example, the speed pulse waveform 330 can provide one or more of the pulses 410 per analog waveform cycle of the analog waveform signal 210. In another example, the speed pulse waveform 330 can provide one of the pulses 410 for every 1, 2, 5, 10, 100, or any other predetermined number of analog waveform cycles of the analog waveform signal 210. In yet another example, the speed pulse waveform 330 can be a pulse width modulated signal in which the pulses 410 vary in width in proportion to the fundamental frequency of the analog waveform signal 210. In some implementations, the speed pulse waveform 330 can be an analog signal that is proportional to the fundamental frequency of the analog waveform signal 210. For example, the speed pulse waveform 330 can be a voltage or current signal that rises and falls proportionally as the fundamental frequency of the analog waveform signal 210 increases and decreases. In some implementations, the speed pulse waveform 330 can be a digital signal that conveys a digital value that represents the fundamental frequency of the analog waveform signal 210. For example, if the fundamental frequency of the analog waveform signal is 120.607 Hz, then the speed pulse waveform 330 can be a computer signal that carries the number "120.607" as a digitally encoded value. To simplify the remaining discussion of these processes, and as an example only, the analog waveform signal 210 will be described as a series of short electrical pulses, in which a single pulse is transmitted in response to the detection of a single analog cycle of the analog waveform signal 210.

In some implementations, the detection circuitry 306 and/or the signal processing module 140 can convert the frequency edge signal into a turbine rotational speed. For instance, the pulse frequency in the frequency edge signal can be converted to a turbine rotational speed based on the number of gear teeth in the gear being sensed by the speed sensor 120. The frequency of the pulse in the speed pulse waveform 330 is equal to the number of gear teeth multiplied by the number of revolutions per minute of the gear and divided by sixty. The measured turbine rotational speed can be output to the engine controller 112 as a rotational speed signal.

In some implementations, some or all of the arming threshold setting, the trigger level setting, the speed pulse waveform 330, the analog waveform signal 210, and the rotational speed signal can be analog signals. For example, one or both of the arming threshold setting and the trigger level setting can be analog voltage or current levels provided by the signal processing module 140, and used in, for example, comparator circuits within the speed sensing system 130 (e.g., compared against the sensed input signal) to determine the speed pulse waveform 330 and the analog waveform signal 210. One or more of the speed pulse waveform 330, the analog waveform signal 210, and the rotational speed signal can be analog direct current signals (e.g., voltages or currents proportional to the values they represent) or dynamic waveform signals.

In some implementations, some or all of the arming threshold setting, the trigger level setting, the speed pulse waveform 330, and the rotational speed signal can be digital signals. For example, one or both of the arming threshold setting and the trigger level setting can be frequency or pulse-width modulated signals that are decodable by circuitry in the speed sensing system 130. In another example, one or both of the speed pulse waveform 330 and the rotational speed signal can be frequency or pulse-width modulated signals that represent their respective frequency and/or speed values.

In some implementations, some or all of the arming threshold setting, the trigger level setting, the speed pulse waveform 330, and the rotational speed signal can be data signals. For example, one of more of the signals can be streams of digitally encoded data that represent configuration settings and/or sensed results.

Figure 5A:
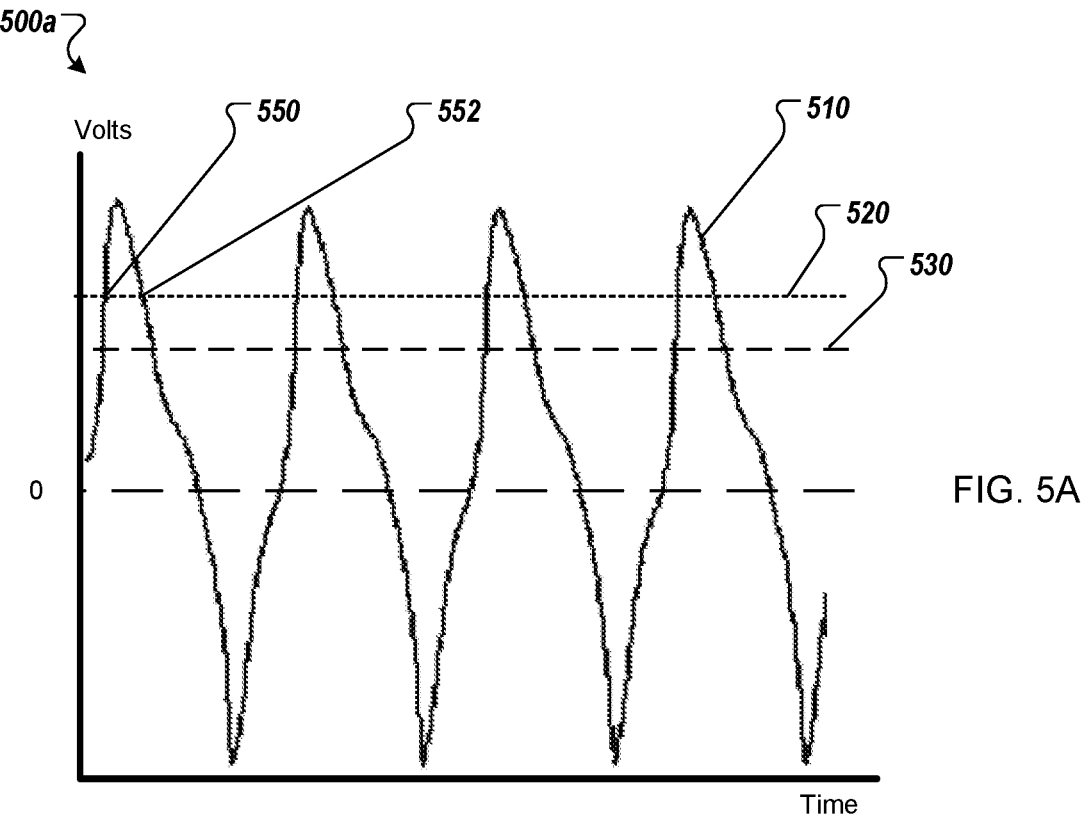
FIGS. 5A and 5B are graphs of an example speed sensor analog signal waveform and speed pulse waveform generated therefrom.
Figure 5B:
Figure 5B:
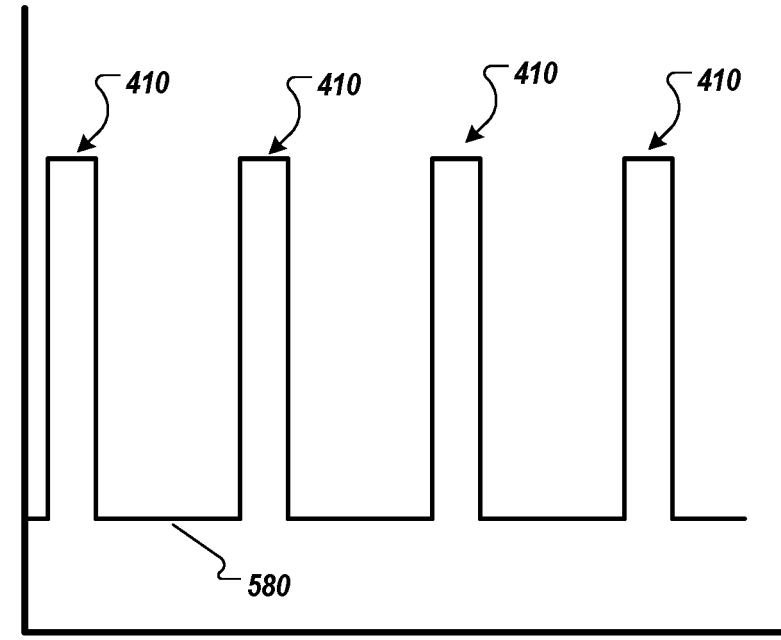

FIG. 5 shows a graph 500a of an example analog waveform signal 510 is shown and a graph 500b of a frequency edge signal 580 generated from analog waveform signal 510. In some implementations, the analog waveform signal 510 can be the example analog waveform signal 210 of FIGS. 2 and 3. The graph also shows an example trigger setting 520 and an example arming level setting 530. In some implementations, the trigger setting 520 can be the example trigger level setting value, and the arming level setting 530 can be the example arming threshold setting value.

In the illustrated example, the analog waveform signal 510 resembles a sinusoidal wave that varies between a peak positive voltage and a peak negative voltage. As an example, in order to facilitate a description of the functions of the trigger setting 520 and the arming level setting 530, the analog waveform signal 510 will be described as a cyclical signal that ranges between −10V and +10V over a complete cycle. Also for purposes of describing just one possible example, the trigger setting 520 can be +5V, with no arming level setting 530 being set. In such an example, the voltage of the analog waveform signal 510 may start at 0V and rise toward +10V, and when the voltage reaches +5V at a point 550, a pulse (e.g., one of the pulses 410) can be transmitted in the example speed pulse waveform 330. In some implementations, the trigger setting 520 can also identify the directionality of the trigger, such as a rising voltage or a falling voltage. For example, the trigger setting 520 can be +5V on a falling voltage. In such an example, the voltage of the analog waveform signal 210 may start at 0V and rise toward +10V, and when the voltage reaches the +5V point

550 during the rise, no pulse will be transmitted in the speed pulse waveform 330. As the voltage of the analog waveform signal 210 peaks at the example +10V maximum and starts falling toward the example −10V minimum, and when the voltage reaches +5V while falling at a point 552, a pulse can be transmitted in the example speed pulse waveform 330.

Still referring to FIG. 5, the arming level setting 530 can be set to affect the triggering. For example, the arming level setting 530 can be +3V, and the trigger setting 520 can remain at +4V. In such an example, the voltage of the analog waveform signal 510 may start at 0V and rise toward +10V, and when the voltage reaches +3V, the trigger is armed (e.g., put in a condition to recognize the trigger setting), and when the voltage continues to rise to +4V on its way to the example +10V peak, a pulse (e.g., one of the pulses 410) can be transmitted in the example speed pulse waveform 330 and the arming is reset. As the voltage peaks and falls through +4V on the way to the negative half of the cycle, no triggering occurs because the triggering is not currently armed.

Detection circuitry 306 provides the speed pulse waveform 330 and/or the rotational edge signal to the engine controller 112 either directly or through the signal processing module 140 using one signal path. In addition, the detection circuitry 306 provides the analog waveform signal, the speed pulse waveform 330, or both to waveform measurement system 310 through a second, separate signal path. The second signal path is isolated from the first signal path such that data communications on the first signal path do not interfere with communications on the first signal path. That way communications with the waveform measurement system 310 are isolated form turbine operation and control signals in the rest of the controller 110.

The waveform measurement system 310 are configured to store and, optionally, analyze samples of the speed sensor waveforms that are being used to control operation of the turbine 101. The waveform systems 310 provide a mechanism for turbine operators to safely view speed sensing signals regardless of the turbine operation state. The waveform measurement system 310 operate independent of the speed control and safety functions of the controller 110, and will not interfere with the run-time deterministic control of the turbine 101. The waveform measurement system 310 provide users access speed sensor data for maintenance and diagnostics any time the controller 110 is powered on.

Access to direct turbine speed sensing data is important at various points in a turbine lifecycle. For example, one is field commissioning. During initial installation it is important to verify that the speed sensor signal output signal (e.g., analog waveform signal 210) is adequate for turbine operation. This can be elusive using traditional methods because signal shape is as important as signal amplitude. Both vary widely over speed operating ranges. Waveform capture that can be accesses at commissioning or any time thereafter is a tool that will improve installation time and turbine control reliability. Another example is signal integrity variation over time. By capturing waveforms periodically, the waveform measurement system 308 can monitor signal shape over time to improve up-time of the turbine. In some implementations, the waveform measurement system 310 can perform automated diagnostic/prognostic analysis on current and stored waveforms. For example, the waveform measurement system 310 can employ a machine learning model to preemptively detect and correct for degradation in speed sensor output over time.

Waveform measurement system 308 can include a waveform digitizer 310, waveform storage 312, and a waveform analyzer 316. Waveform measurement system 308 can interface with a user interface 314. User interface can be an interface that is integral to the turbine controller 110, e.g., a touch screen interface, or a display with a keyboard or other user input device. User interface 314 can be a separate computer device (e.g., a laptop computer, tablet computer, smartphone, etc.) that can be connected to an input/output interface of the waveform measurement system 308. User interface 314 can be directly connected to turbine controller 110 through an input/output interface of the waveform measurement system 308. In some implementations, the input/output interface is a wireless interface configured to establish a wireless connection with a user interface 314. The user interface 314 can interact with the waveform measurement system 308 to permit turbine operators to access and view stored waveforms and or analyses performed by the waveform measurement system 308.

The waveform digitizer 310 receives the sensor data signals (e.g., analog waveform signal 210 and speed pulse waveform 330) from the detection circuitry 306. The waveform digitizer 310 can convert the sensor data signals into a digital format. For example, the waveform digitizer 310 can include an analog to digital converter (A/D converter), quantizer, and encoder to convert the sensor data signals into digital format, e.g., for storage and/or analysis. The waveform digitizer 310 can digitize and store individual samples of the sensor data signals in waveform storage 312. For example, the waveform digitizer 310 can be configured to record waveform samples that represent one or more full rotations of the turbine 101. In some examples, each individual waveform sample represents sensor data equivalent to one full rotation of the turbine 101. In that way, each waveform sample records sensor waveforms representative of detections signals for each tooth in a turbine gear.

In some implementations, the waveform digitizer 310 appends metadata to the individual waveform samples. The metadata can include, e.g., a timestamp indicating the date and time the signal was received, turbine operating characteristics, data associating samples of an analog waveform signal 210 with the respective speed pulse waveform 330 generated from that particular analog waveform signal 210, or a combination thereof. The turbine operating characteristics can include calculated turbine speed, operating load output, vibration, ambient air temperature, fuel flow, and/or other operating characteristics. In some implementations, the waveform digitizer 310 can receive current threshold level setting and arming threshold setting values used by the detection circuitry 306. The waveform digitizer 310 can store these values as metadata with the associated individual waveform samples, e.g., for review by turbine operators.

Waveform storage 312 can include any appropriate type of computer memory including, e.g., semiconductor memory devices, such as EPROM, EEPROM, and flash memory devices; magnetic disks such as internal hard disks and removable disks; magneto-optical disks; and CD-ROM and DVD-ROM disks.

In some implementations, the waveform measurement system 308 includes a waveform analyzer 316. The waveform analyzer 316 can receive waveform samples from waveform digitizer 310 or access stored waveform samples from waveform storage 312. The waveform analyzer 316 can analyze the waveform samples to perform automate diagnostics. For example, the waveform analyzer 316 can compare stored and current waveform samples to detect changes in speed sensor measurements. The waveform analyzer 316 can compare waveform samples obtained under similar turbine operation characteristics. In some implementations, the waveform analyzer 316 can detect changes in wave shapes and/or amplitudes that indicate changes or degradation of the speed sensor 120 including movement of the sensor 120 damage or degradation in cabling, etc. For example, changes in signal strength (amplitude) may represent an increase in sensor probe-tooth distance, thus indicating that the speed sensor has shifted within its housing or mount in the turbine. As another example, changes in shape of the waveforms may represent degradation in cabling or the speed wheel (e.g., a damaged tooth). In some implementations, the waveform analyzer 316 can employ a machine learning model to identify changes in sensor waveforms that indicate change or degradation in the speed sensor 120. For example, the waveform analyzer 316 can communicate with a cloud-based machine learning model through the user interface 314 to perform waveform analysis.

Figures 6A, 6B:
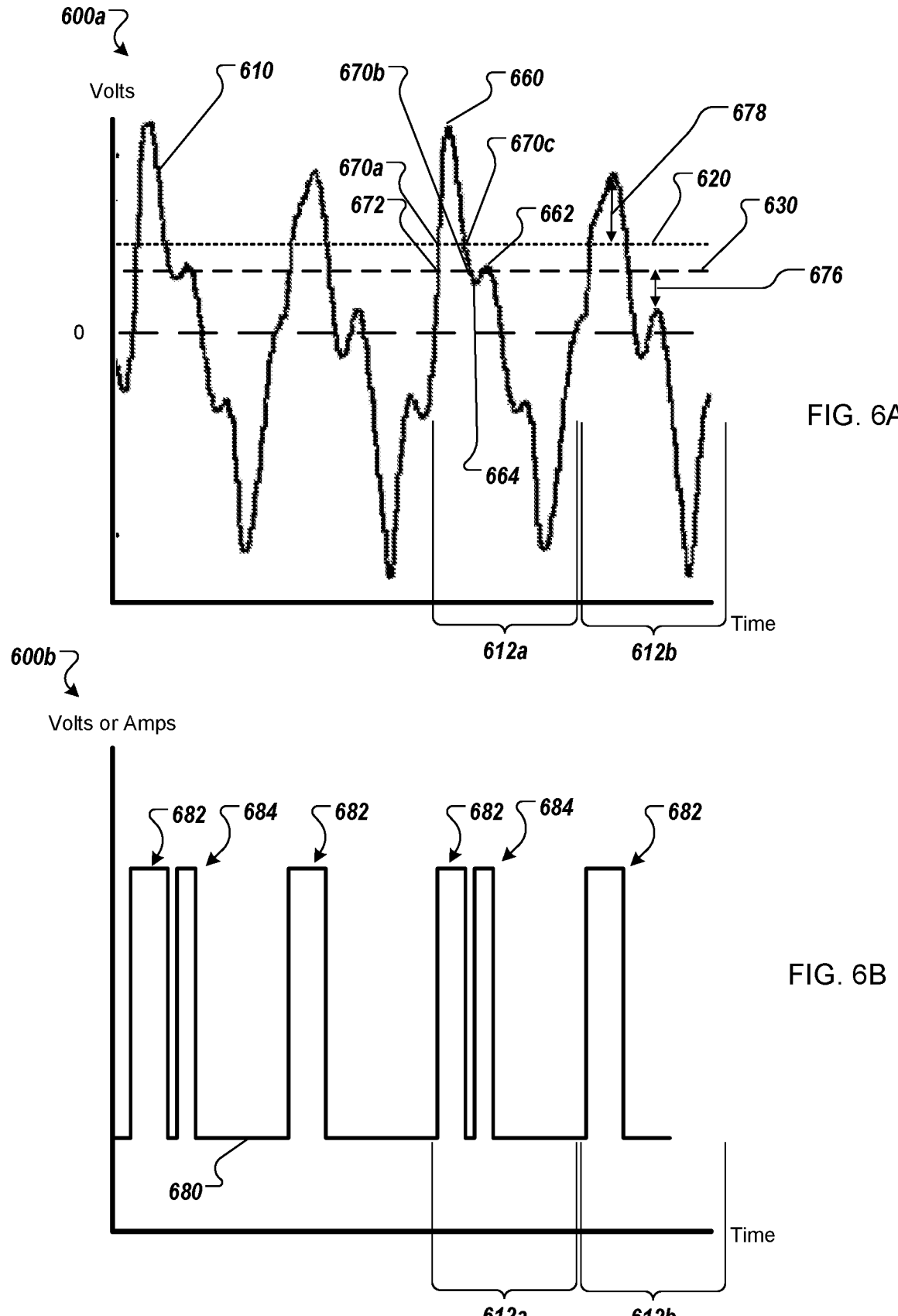
FIGS. 6A and 6B is a graph of another example speed sensor analog signal waveform and speed pulse waveform generated therefrom.

In some implementations, waveform analyzer 316 can determine a margin from a pulse detection trigger setting value and/or a pulse detection arming level setting value. For example, FIG. 6 shows a graph 600a of an example analog waveform signal 610 and a graph 600b corresponding frequency edge signal 680 generated from analog waveform signal 610. In some implementations, the analog waveform signal 610 can be the example analog waveform signal 210 of FIGS. 2 and 3. The graph also shows an example trigger setting 620 and an example arming level setting 630. In general, the analog waveform signal 610 is an example of a slightly more complex example than the example analog waveform signal 510 of FIG. 5. The analog waveform signal 610 includes double-peaks in each cycle, such as an absolute maxima 660 and a local maxima 662 in a cycle 612a. Such double-peaks can be the result of variations in the sensor signal variables discussed above (e.g., wheel/gear dimensions, cable parameter's, impedance matching, etc.). Such double peaks can cause inaccurate speed measurements due to the generation of shadow pulses 684 in the frequency edge signal 680 when the trigger setting is armed and re-triggered by the second peak.

The amplitude and overall shape of analog frequency signals from speed sensors, such as the analog waveform signals 510 and 610, typically changes with rotational speed, and because the waveform shapes changes, the arming and triggering thresholds of typical speed sensors can be difficult to configure and it can be important to maintain a record of waveforms that cause such double triggering. For industrial turbine control the challenge can be even greater, because industrial installations use many different probe types, gear types, cable lengths, cable types, etc. This can result in even larger variations in the speed sensing waveforms generated by variable reluctance sensors and potential noise detected by the turbine/engine control. The details of example systems and techniques for adaptively and dynamically setting arming and triggering thresholds to provide cleaner and more useful frequency signals (from which, for example, turbine speeds can be determined) from sensor signals having varying waveforms are described in more detail below.

In the illustrated example, due to the complexity of the analog waveform signal 610, the voltage crosses the trigger setting 620 four times during the single cycle 612, at points 670a, 670b, and 670c. However, also due to the complexity of the analog waveform signal 610, this number of value crossings is not consistent or proportional from cycle to cycle. For example, there are only two such crossings in a cycle 612b, therefore resulting in the generation of a correct pulse 682 and a shadow pulse 684 in the frequency edge signal 680. Without the additional use of the arming level setting 630, set at a predetermined and appropriate threshold, the cycle 612a could trigger two frequency pulses (pulses 682 and 684) and the cycle 612b could trigger one frequency pulse (pulse 682) even though the fundamental frequency of the analog waveform signal 610 is substantially the same from the cycle 612a to the cycle 612b.

In some implementations, the waveform analyzer 316 can detect shadow pluses 682 and output an alert to the user interface 314. For example, the waveform analyzer 316 can identify shadow pulses 682 based on abrupt changes in the frequency or shape of the pulses in the frequency edge signal 680. In some implementations, data indicating detection of shadow pulses 682 can be stored as metadata associated with the respective waveform samples.

In some implementations, the waveform analyzer 316 can determine margins from arming level and threshold level settings. For example, the waveform analyzer 316 can detect the margin 676 between arming level setting 630 and a double-peak of an analog waveform signal pulse (e.g., local maxima 662). For example, the waveform analyzer 316 can detect a local maxima 662 and the corresponding voltage value using signal analysis techniques and determine the voltage margin from arming level setting values used for pulse detection when the respective waveform was sampled. The waveform analyzer 316 can detect the margin 678 between trigger setting 620 and the maximum peak of an analog waveform signal pulse (e.g., maxima 660). For example, the waveform analyzer 316 can detect a local maxima 662 and the corresponding voltage value using signal analysis techniques and determine the voltage margin from arming level setting values used for pulse detection when the respective waveform was sampled.

In some implementations, the waveform analyzer 316 can isolate individual tooth detection pulses in an analog waveform signal 610 to perform further analysis. In some implementations, the waveform analyzer 316 can compare wave shapes between individual tooth detection pulses in an analog waveform signal 610 to detect changes in the speed sensor 120 or the turbine gear. For example, the difference in shape between the pulse in cycle 612a and the pulse in cycle 612b may represent damage to one of the teeth in a turbine gear (e.g., a burr or a chip).

The waveform measurement system 311 can record such analysis data for later review by a user, for analysis (e.g., by waveform analysis system 316) and detection errors in the setting of the arming level setting and/or trigger setting. The analysis data can be stored in metadata associated with the respective waveform samples.

In some implementations, the user interface 314 can permit a turbine operator to access current or stored waveform samples. The user interface 314 can permit a turbine operator to interact with graphical representations of the waveform samples. For example, the user interface 314 can present traceable graphics of the waveform samples. In other words, the user interface 314 can display interactive graphical representations that allow users to trace the graphic representations with a cursor and present voltage values of the waveforms at locations along the waveform graphic is traced.

Figure 7:
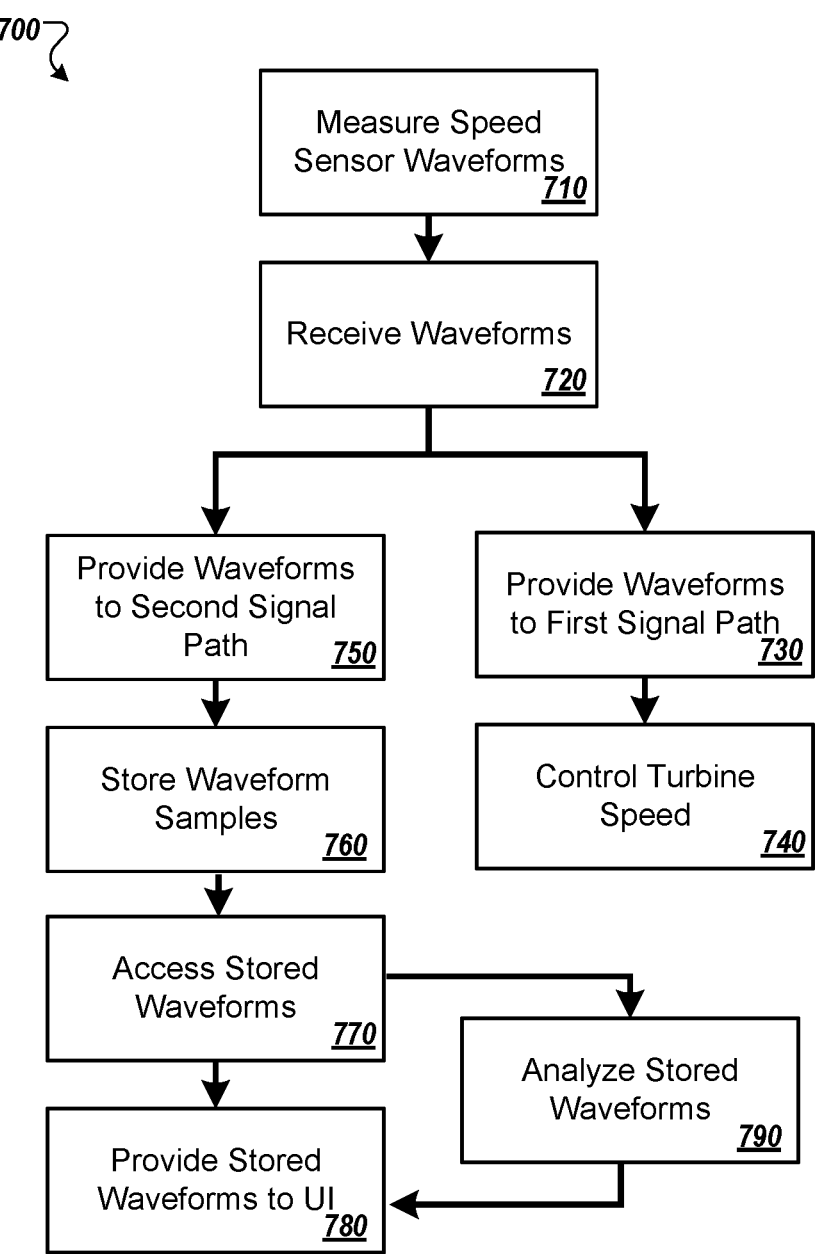
FIG. 7 is a flow diagram of an example process for controlling a turbine.

FIG. 7 is a flow diagram of an example process 700 for controlling a turbine engine. In some implementations, the process 700 can be performed by all or part of the example system 100 of FIG. 1, or by the example speed sensing system 130 and/or the example waveform measurement system 308 of FIGS. 1 and 3.

A control system measures waveforms (e.g., analog signal waveforms 210) indicative of a speed of a rotating machine (710). For example, the control system can use a speed sensor such as a variable reluctance type sensor or a magnetic pick-up unit (MPU) to measure to detect magnetic/electrical impulses generated by a rotating gear of a machine, e.g., a turbine.

The control system receives the waveforms from the speed sensor (720) and provides the analog signal waveforms to a first signal path (730) and a second signal path (730). The first signal path and second signal path are isolated from each other such that communications on each signal path do not interfere with communications on the other. For example, the first signal path is a control signal path within the control system that is used to provide control and safety data communication for operation of the machinery. The second signal path is a data logging or diagnostics signal path. Communication on the second signal path is not critical to the operation of the machinery.

In some implementations, the control system performs a speed detection process on the waveforms to determine a rotational speed of the machine. For instance, as discussed above, the system can detect pulses within the waveforms that represent the passage of gear teach in front of the speed sensor to generate a speed pulse waveform (e.g., speed pulse waveform 330). The system can determine the speed of the rotational machine based on the pulse waveform. In such implementations the system can provide both the analog signal waveforms and the speed pulse waveforms to both the first and second signal paths.

The control system controls operation of the machinery based on the speed represented in the waveforms from the speed sensor from the first signal path (740).

The control system stores the waveforms received from the second signal path (760). For example, the system individual samples of the data in association with a respective timestamp indicating a time that the data was received. In some cases, each stored sample includes representations of both the analog signal waveform measured by the speed sensor and the speed pulse waveform representing gear tooth detection signal based on the analog signal waveform. The waveforms can be sampled in a manner such that each stored waveform represents one or more than one full rotations of the machine.

In some implementations, the waveform samples can be stored along with additional metadata relevant to the samples. For example, the metadata can include threshold level setting and arming threshold setting values used by the detection circuitry to detect pulses, a timestamp indicating the date and time the signal was received, turbine operating characteristics, or a combination thereof.

The system can include a user interface (UI) or a user interface connection that permits access to the stored waveforms. In response to a user input on the UI, the system can access the stored waveforms (770) and provide the requested waveforms for display on the UI (780). For example, the UI can be configured to run an application that is programed to interface with the control system. The application can access a database index of waveforms stored by the control system and permit a user to select and review past speed sensor waveforms.

In some implementations, the control system can analyze stored waveforms (790). For example, the system can analyze the stored waveforms to identify changes in the operation of the speed sensor or speed sensing circuits of the control system. The system can compare waveforms from the original installation of the machinery and/or the most recent replacement or maintenance of the speed sensor with current waveforms to detect damage or degradation in sensor performance.

Figure 8:
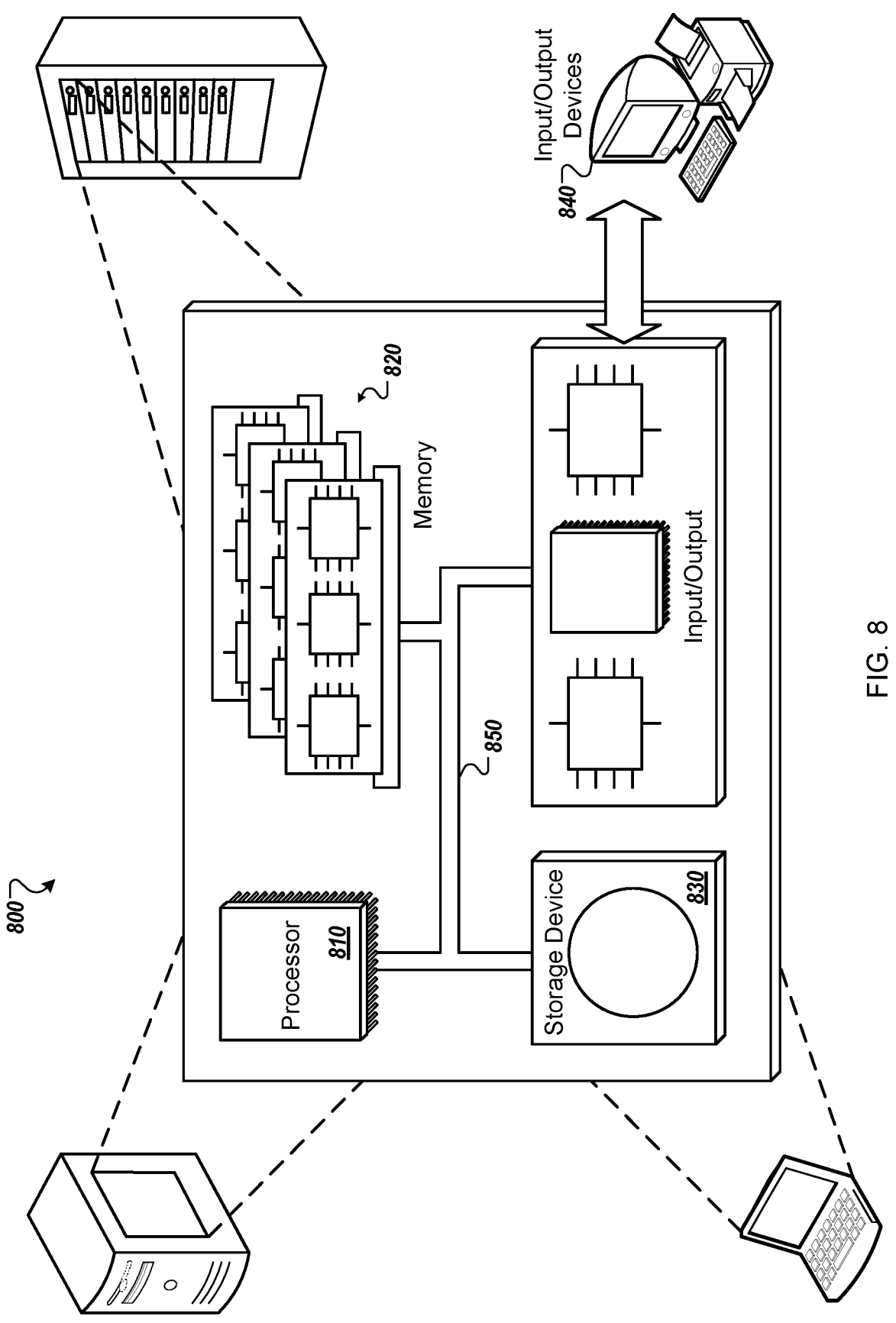
FIG. 8 is a schematic diagram of an example of a generic computer system.

FIG. 8 is a schematic diagram of an example of a generic computer system 800 (e.g., a data processing apparatus). The system 800 can be used for the operations described in association with the method 300 according to one implementation.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 (e.g., a non-transitory memory) stores information within the system 800. In one implementation, the memory 820 is a computer-readable medium. In one implementation, the memory 820 is a volatile memory unit. In another implementation, the memory 820 is a non-volatile memory unit.

The storage device 830 (e.g., non-transitory storage) is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, this concept is not limited to aircraft engine control or industrial turbine control; it would be applicable to any appropriate frequency signal derived from a variable reluctance sensor. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A machinery speed control system comprising:
a speed sensor configured to measure a speed of a rotating machine;
detection circuitry in communication with and isolated from the speed sensor, the detection circuitry comprising a first output and a second output, the detection circuitry configured to receive waveforms measured by the speed sensor, provide a first output signal comprising data representing the waveforms to the first output, and provide a second output signal comprising the waveforms to the second output, the second output being isolated from the first output such that data communications at the second output do not interfere with communications on the first output;

control circuitry coupled to the first output of the detection circuitry, the control circuitry configured to control one or more operations of the rotating machine responsive to the data from the detection circuitry; and
measurement circuitry coupled to the second output of the detection circuitry, the measurement circuitry configured to sample the waveforms from the detection circuitry and store individual samples in association with a respective timestamp indicating a time that the waveforms were received.

2. The machinery speed control system of claim 1, wherein each sample of the data comprises a plurality of waveforms representing at least one full rotation of the rotating machine.

3. The machinery speed control system of claim 1, wherein each sample of the data comprises first data representing waveforms measured by the speed sensor and second data representing a gear tooth detection signal based on waveforms.

4. The machinery speed control system of claim 1, wherein the measurement circuitry comprises a user interface configured to permit a user to access and view the individual samples.

5. The machinery speed control system of claim 1, wherein the measurement circuitry is configured to:
determine, for at least one sample, a margin between a peak of the waveform and a gear tooth detection threshold value; and
store the margin in associate with the sample.

6. The machinery speed control system of claim 1, wherein the rotating machine is a gas turbine or a steam turbine.

7. The machinery speed control system of claim 1, wherein the second output signal comprises both first data representing waveforms measured by the speed sensor and second data representing a gear tooth detection signal based on waveforms.

8. The machinery speed control system of claim 1 comprising a machine learning model configured to receive as input a plurality of individual samples and, based on comparing the individual samples, identify a sensor fault.

9. The machinery speed control system of claim 1, wherein measurement circuitry is configured to store, with each individual sample, a tooth detection threshold used by the control circuitry at the time of the individual sample.

10. The machinery speed control system of claim 1, wherein the speed sensor is a magnetic pickup unit, a proximity probe, an eddy-current probe, or a variable reluctance type sensor.

11. A system comprising:
a rotating machine having a speed control system comprising:
a speed sensor coupled to the rotating machine and configured to measure a speed of the rotating machine;
detection circuitry in communication with and magnetically isolated from the speed sensor, the detection circuitry comprising a first output and a second output, the detection circuitry configured to receive waveforms measured by the speed sensor, provide a first output signal comprising data representing the waveforms to the first output, and provide a second output signal comprising the waveforms to the second output, the second output being isolated from the first output such that data communications at the second output do not interfere with communications on the first output;

control circuitry coupled to the first output of the detection circuitry, the control circuitry configured to control one or more operations of the rotating machine responsive to the data from the detection circuitry; and measurement circuitry coupled to the second output of the detection circuitry, the measurement circuitry configured to sample the waveforms from the detection circuitry and store individual samples in association with a respective timestamp indicating a time that the waveforms were received.

12. The system of claim 11, wherein each sample of the data comprises a plurality of waveforms representing at least one full rotation of the rotating machine.

13. The system of claim 11, wherein each sample of the data comprises first data representing waveforms measured by the speed sensor and second data representing a gear tooth detection signal based on waveforms.

14. The system of claim 11, wherein the measurement circuitry comprises a user interface configured to permit a user to access and view the individual samples.

15. The system of claim 11, wherein the measurement circuitry is configured to:

determine for at least one sample a margin between a peak of the waveform and a gear tooth detection threshold value; and store the margin in associate with the sample.

16. The system of claim 11, wherein the rotating machine is a gas turbine.

17. The system of claim 11, wherein the rotating machine is a steam turbine.

18. The system of claim 11, wherein the speed control system comprises a machine learning model configured to receive as input a plurality of individual samples and, based on comparing the individual samples, identify a sensor fault.

19. The system of claim 11, wherein measurement circuitry is configured to store, with each individual sample, a tooth detection threshold used by the control circuitry at the time of the individual sample.

20. A machine control method comprising:

measuring, by a speed sensor, waveforms indicative of a speed of a rotating machine;

receiving the waveforms from the speed sensor and providing a first output signal comprising data representing the waveforms to a first signal path and providing a second output signal comprising the waveforms to a second signal path, wherein the second signal path is isolated from the first signal path such that data communications at the second signal path do not interfere with communications on the first signal path;

controlling, responsive to the data received along the first signal path, one or more operations of the rotating machine;

storing, the data received along the second signal path, individual samples of the data in association with a respective timestamp indicating a time that the data was received.

* * * * *